(12) United States Patent
Kimata et al.

(10) Patent No.: US 7,466,969 B2
(45) Date of Patent: Dec. 16, 2008

(54) MIMO RECEIVER, MIMO RECEPTION METHOD AND WIRELESS COMMUNICATION SYSTEM

(75) Inventors: Masayuki Kimata, Tokyo (JP); Shousei Yoshida, Tokyo (JP)

(73) Assignee: NEC Corporation, Tokyo (JP)

(*) Notice: Subject to any disclaimer, the term of this patent is extended or adjusted under 35 U.S.C. 154(b) by 481 days.

(21) Appl. No.: 11/365,669

(22) Filed: Mar. 2, 2006

(65) Prior Publication Data

US 2006/0199557 A1   Sep. 7, 2006

(30) Foreign Application Priority Data

Mar. 4, 2005   (JP) .............................. 2005-060770

(51) Int. Cl.
*H04B 1/06* (2006.01)

(52) U.S. Cl. ...................... 455/272; 455/307; 375/147; 375/267; 375/360

(58) Field of Classification Search ................. 455/269, 455/272, 307, 323, 334, 339; 375/147, 260, 375/267, 322, 324, 346, 347, 350; 370/320, 370/335, 342
See application file for complete search history.

(56) References Cited

U.S. PATENT DOCUMENTS 7,006,041 B2 *   2/2006   Fujii et al. ................... 342/372
7,359,466 B2 *   4/2008   Huang et al. ................. 375/349
7,386,057 B2 *   6/2008   Ito et al. ...................... 375/267

OTHER PUBLICATIONS

Xu Zhu, et al. "Novel Frequency-Domain Equalization Architectures for a Single-Carrier Wireless MIMO System," IEEE VTC2002-Fall, pp. 874-878, Sep. 2002.

* cited by examiner

*Primary Examiner*—Quochien B Vuong
(74) *Attorney, Agent, or Firm*—Sughrue Mion, PLLC

(57) ABSTRACT

A MIMO receiver, a MIMO reception method and a wireless communication system capable of accurate MMSE control even when each transmit antenna uses a different chip power ratio in MIMO filter reception. A correction coefficient calculator receives as input the chip power ratio of each transmit antenna, and estimates such pilot power that renders the chip power ratio of each transmit antenna equal to that of a reference transmit antenna. Thereby, the correction coefficient calculator calculates a correction coefficient $\beta_m$ to correct the actual pilot power of each transmit antenna. A weight calculator receives as input transmission channel impulse responses transferred into frequency domain by FFT sections, chip noise power estimated by a chip noise estimation section, and the correction coefficient $\beta_m$ obtained by the correction coefficient calculator. The weight calculator calculates filter weights according to the minimum mean square error (MMSE) criterion.

7 Claims, 6 Drawing Sheets

FIG. 6
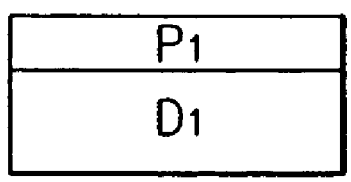
TRANSMIT POWER OF
TRANSMIT ANTENNA 1
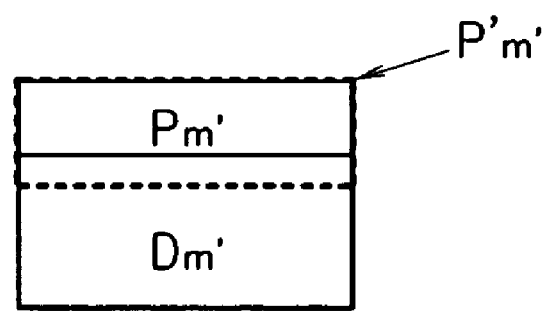
TRANSMIT POWER OF
TRANSMIT ANTENNA m'

MIMO RECEIVER, MIMO RECEPTION METHOD AND WIRELESS COMMUNICATION SYSTEM

FIELD OF THE INVENTION

The present invention relates to a MIMO receiver, a MIMO reception method and a wireless communication system, and more particularly, to a MIMO receiver, a MIMO reception method and a wireless communication system for demodulating signals according to the minimum mean square error (MMSE) criterion with a plurality of receive antennas.

BACKGROUND OF THE INVENTION

In a wireless communication system for the next-generation mobile communications, it is important to achieve high-speed data transmission. As a technology to realize high-speed data transmission, the MIMO (Multiple Input Multiple Output) multiplexing system attracts attention. According to the MIMO multiplexing system, signals are transmitted at the same frequency and time through a plurality of transmit antennas, and the signals are demodulated (separated) through a plurality of receive antennas.

FIG. 1 is a diagram showing a MIMO transmitter/receiver having M (M: an integer not less than 1) transmit antennas and N (N: an integer not less than 1) receive antennas. Referring to FIG. 1, the MIMO transmitter/receiver comprises transmit antennas 1-1 to 1-M and a transmitter 2 on the transmitting side, and receive antennas 3-1 to 3-N and a receiver 4 on the receiving side. The MIMO transmitter/receiver transmits different signals through the plurality of transmit antennas 1-1 to 1-M at the same frequency and time, and receives them through the plurality of receive antennas 3-1 to 3-N. Thereby, the MIMO transmitter/receiver is capable of high-speed data transmission in proportion to the number of transmit antennas without any increase in transmission bandwidth. The receiving side is required to perform signal separation to demodulate the signals received through the receive antennas 3-1 to 3-N to the original signals from the transmit antennas 1-1 to 1-M.

There are a variety of methods to demodulate a MIMO multiplexed signal. Among them is linear filter reception, which can be relatively easily conducted. When the MIMO multiplexing is applied to DS-CDMA (Direct Sequence-Code Division Multiple Access) signals, in addition to interference from other transmit antennas, the multipath of desired transmit antenna signals interferes with the DS-CDMA signals. The filter reception is advantageous to suppress such interference all at once. There has been proposed a frequency-domain equalizer that performs the signal processing in the frequency domain by a simple method. Reference may be had to, for example, Xu Zhu and Ross D. Murch, "Novel Frequency-Domain Equalization Architectures for a Single-Carrier Wireless MIMO System," IEEE VTC2002-Fall, pp. 874-878, September 2002.

FIG. 2 is a diagram showing an example of the construction of a DS-CDMA MIMO receiver to which is applied the aforementioned frequency-domain equalizer. In the following, a description will be given of the MIMO receiver with M (M: an integer not less than 1) transmit antennas and N (N: an integer not less than 1) receive antennas. As can be seen in FIG. 2, the conventional MIMO receiver comprises transmission channel estimation sections 10-1-1 to 10-M-N, S/P (Serial to Parallel) converters 11-1-1 to 11-M-N and 14-1 to 14-N, FFT (Fast Fourier Transform) sections 12-1-1 to 12-M-N and 15-1 to 15-N, GI (Guard Interval) removal sections 13-1 to 13-N, a chip noise estimation section 16, a weight calculator 17, a filter 18, IFFT (Inverse Fast Fourier Transform) sections 19-1 to 19-M, P/S (Parallel to Serial) converters 20-1 to 20-M, and despread circuits 21-1 to 21-M.

The transmission channel estimation sections 10-1-1 to 10-M-N input therein signals received by the receive antennas 3-1 to 3-N, respectively. With a known pilot signal contained in the received signal, the transmission channel estimation sections 10-1-1 to 10-M-N each estimate a transmission channel estimation value with respect to each path between the transmit antennas 1-1 to 1-M and the receive antennas 3-1 to 3-N to obtain the impulse response.

The S/P converters 11-1-1 to 11-M-N convert the impulse responses of the transmission channels estimated by the transmission channel estimation sections 10-1-1 to 10-M-N from serial to parallel.

The FFT sections 12-1-1 to 12-M-N receive as input the transmission channel impulse responses converted by the S/P converters 11-1-1 to 11-M-N, respectively, to transfer them into frequency domain.

The chip noise estimation section 16 inputs therein the signals received by the receive antennas 3-1 to 3-N as well as the transmission channel estimation values obtained by the transmission channel estimation sections 10-1-1 to 10-M-N to estimate chip noise power.

The weight calculator 17 receives as input the transmission channel impulse responses transferred into frequency domain by the FFT sections 12-1-1 to 12-M-N and the chip noise power estimated by the chip noise estimation section 16. The weight calculator 17 calculates filter weights according to the minimum mean square error (MMSE) criterion.

The GI removal sections 13-1 to 13-N input therein signals received by the receive antennas 3-1 to 3-N, and eliminate part of the received signals corresponding to GI based on receive path timing.

The S/P converters 14-1 to 14-N convert the received signals, from which GI has been removed by the GI removal sections 13-1 to 13-N, from serial to parallel.

The FFT sections 15-1 to 15-N receive as input the received signals converted by the S/P converters 14-1 to 14-N, respectively, to transfer them into frequency domain.

The filter 18 inputs therein the weights obtained by the weight calculator 17 and the received signals transferred into frequency domain by the FFT sections 15-1 to 15-N. The filter 18 performs filtering (equalization) of the received signals in frequency domain.

The IFFT sections 19-1 to 19-M receive as input the frequency-domain signals equalized by the filter 18 to transfer them back to time domain.

The P/S converters 20-1 to 20-M convert back the signals transferred into time domain from parallel to serial.

The despread circuits 21-1 to 21-M receive as input the time-domain signals converted by the P/S converters 20-1 to 20-M, and despread the signals to demodulate them to the original signals transmitted from the transmit antennas 1-1 to 1-M.

FIG. 3 is a block diagram showing the construction of the weight calculator 17 for a subcarrier f ($1 \leq f \leq F$) after the FFT. The conventional weight calculator 17 for the subcarrier f comprises correlation matrix generators 30-1 to 30-M, a correlation matrix adder 31, a noise adder 32, an inverse matrix calculator 33, and weight generators 34-1 to 34-M. The weight calculator 17 for each subcarrier has the same construction as described above.

The correlation matrix generators 30-1 to 30-M receive as input the transmission channel estimation values between the transmit and receive antennas transferred into frequency domain by the FFT sections 12-1-1 to 12-M-N shown in FIG. 2. Each of the correlation matrix generators 30-1 to 30-M generates a correlation matrix from transmit to receive antennas with respect to each transmit antenna.

The correlation matrix adder 31 receives as input the correlation matrices for the respective transmit antennas 1-1 to 1-M generated by the correlation matrix generators 30-1 to 30-M to add up them.

The noise adder 32 receives as input the summation correlation matrix obtained by the correlation matrix adder 31, the chip noise power estimated by the chip noise estimation section 16 shown in FIG. 2, and chip power ratio. The noise adder 32 multiplies the chip noise power by the inverse of the chip power ratio, and adds the product to the correlation matrix.

The inverse matrix calculator 33 receives as input the correlation matrix to which a noise component has been added by the noise adder 32, and performs inverse matrix calculation.

The weight generators 34-1 to 34-M receive as input the inverse matrix obtained by the inverse matrix calculator 33 and transmission channel estimation values between the transmit and receive antennas transferred into frequency domain. Thereby, the weight generators 34-1 to 34-M generate filter weights.

Next, a description will be given in detail of the above processing through the use of mathematical expressions. The transmission channel vector $H_m(f)$ between the transmit antenna m ($1 \leq m \leq M$) and the receive antennas of the subcarrier f, in which the transmission channel impulse responses have been transferred into frequency domain by the FFT sections 12-1-1 to 12-M-N, is defined as follows:

$$H_m(f) = [h_{m,1}(f), h_{m,2}(f), \ldots, h_{m,N}(f)]^T \quad (1)$$

where T denotes transpose. Besides, the received signal vector X(f) of the subcarrier f, in which the received signals have been transferred into frequency domain by the FFT sections 15-1 to 15-N, is defined as follows:

$$X(f) = [x_1(f), x_2(f), \ldots, x_N(f)]^T \quad (2)$$

The weight vector $W_m(f)$ of the filter of the transmit antenna m for the subcarrier f calculated by the weight calculator 17 is given by the following expression:

$$W_m(f) = \left[ \sum_{m'=1}^{M} H_{m'}(f) H_{m'}^H(f) + \frac{PN_0}{P+D} I \right]^{-1} H_m(f) \quad (3)$$

where H denotes complex conjugate transpose, P is pilot power, D is data power, $N_0$ is chip noise power, and I is identity or unit matrix.

The transmitted signal vector Y(f) in the subcarrier f of the signal which has undergone equalization and filtering at the filter 18 is expressed as follows:

$$Y(f) = W^H(f) X(f) \quad (4)$$

where W(f) and Y(f) are defined as follows:

$$W(f) = [W_1(f), W_2(f), \ldots, W_M(f)]^T \quad (5)$$

$$Y(f) = [Y_1(f), Y_2(f), \ldots, Y_M(f)]^T \quad (6)$$

The conventional MIMO receiver, however, has the following problem. In the calculation of filter weights by the weight calculator 17, the correlation matrix generators 30-1 to 30-M generate a correlation matrix with respect to each transmit antenna. When the correlation matrix adder 31 adds up the correlation matrices for all the transmit antennas, the values of them determine the degree of suppression of interference between the transmit antennas. The aforementioned frequency-domain equalizer calculates filter weights on the assumption that the respective transmit antennas use the same total chip signal power to pilot signal power ratio (chip power ratio) r=(P+D)/P. Consequently, when the transmit antennas use different chip power ratios (perform adaptive modulation, etc.), respectively, the MMSE weight precision decreases, and the characteristics deteriorate.

SUMMARY OF THE INVENTION

It is therefore an object of the present invention to provide a MIMO receiver, a MIMO reception method and a wireless communication system. When each transmit antenna uses a different chip power ratio in MIMO filter reception, the MIMO receiver corrects pilot power so that the chip power ratio of each transmit antenna is equal to that of the reference transmit antenna and then calculates filter weights to perform accurate MMSE control, thereby achieving excellent characteristics.

In accordance with an aspect of the present invention, to achieve the object mentioned above, there is provided a MIMO receiver for receiving signals transmitted from a plurality of transmit antennas through a plurality of receive antennas. The MIMO receiver comprises a correction coefficient calculator for assuming such pilot power as to render the total chip signal power to pilot signal power ratio (chip power ratio) of each transmit antenna equal to that of a reference transmit antenna and calculating a correction coefficient to correct the actual pilot power of each transmit antenna, a weight calculator for calculating filter weights according to the minimum mean square error (MMSE) criterion using the correction coefficient and transmission channel estimation values between all the transmit and receive antennas, and a filter for filtering received signals with the weights and demodulating desired transmit antenna signals while suppressing interference transmit antenna signals.

The correction coefficient calculator of the MIMO receiver is fed with the chip power ratios $\gamma_1, \gamma_2, \ldots, \gamma_M$ (M: an integer not less than 1) of the respective transmit antennas, and calculates correction coefficients $\beta_1, \beta_2, \ldots, \beta_M$ to be 1, $\gamma_2/\gamma_1, \ldots, \gamma_M/\gamma_1$, respectively, when using $\gamma_1$ as the chip power ratio of the reference transmit antenna.

The weight calculator and the filter of the MIMO receiver perform signal processing in time domain.

The weight calculator and the filter of the MIMO receiver perform signal processing in frequency domain.

The weight calculator of the MIMO receiver, which performs signal processing in frequency domain, includes correlation matrix generators each generating a correlation matrix with respect to each transmit antenna based on transmission channel estimation values between the transmit and receive antennas expressed in frequency domain, correction coefficient multipliers each multiplying the correlation matrix with respect to each transmit antenna generated by the correlation matrix generator by the correction coefficient obtained by the correction coefficient calculator, a correlation matrix adder for adding up all the correlation matrices for the respective transmit antennas each multiplied by the correction coefficient, a noise power adder for adding a noise component multiplied by the inverse of the chip power ratio of the reference transmit antenna to the summation correlation matrix obtained by the correlation matrix adder, an inverse matrix calculator for calculating the inverse matrix of the correlation matrix to which the noise component has been added by the noise power adder, and weight generators each generating a weight based on the inverse matrix of the correlation matrix obtained by the inverse matrix calculator and the transmission channel estimation values between the transmit and receive antennas expressed in frequency domain.

As is described above, in accordance with the present invention, when each transmit antenna uses a different chip power ratio in MIMO filter reception, the MIMO receiver corrects pilot power so that the chip power ratio of each transmit antenna is equal to that of the reference transmit antenna and calculates filter weights to perform accurate MMSE control, thereby achieving excellent characteristics.

BRIEF DESCRIPTION OF THE DRAWINGS

The exemplary aspects and features of the present invention will become more apparent from the consideration of the following detailed description taken in conjunction with the accompanying drawings in which:

FIG. 6 is a diagram showing corrected pilot power.

DESCRIPTION OF THE PREFERRED EMBODIMENT

Figure 1:
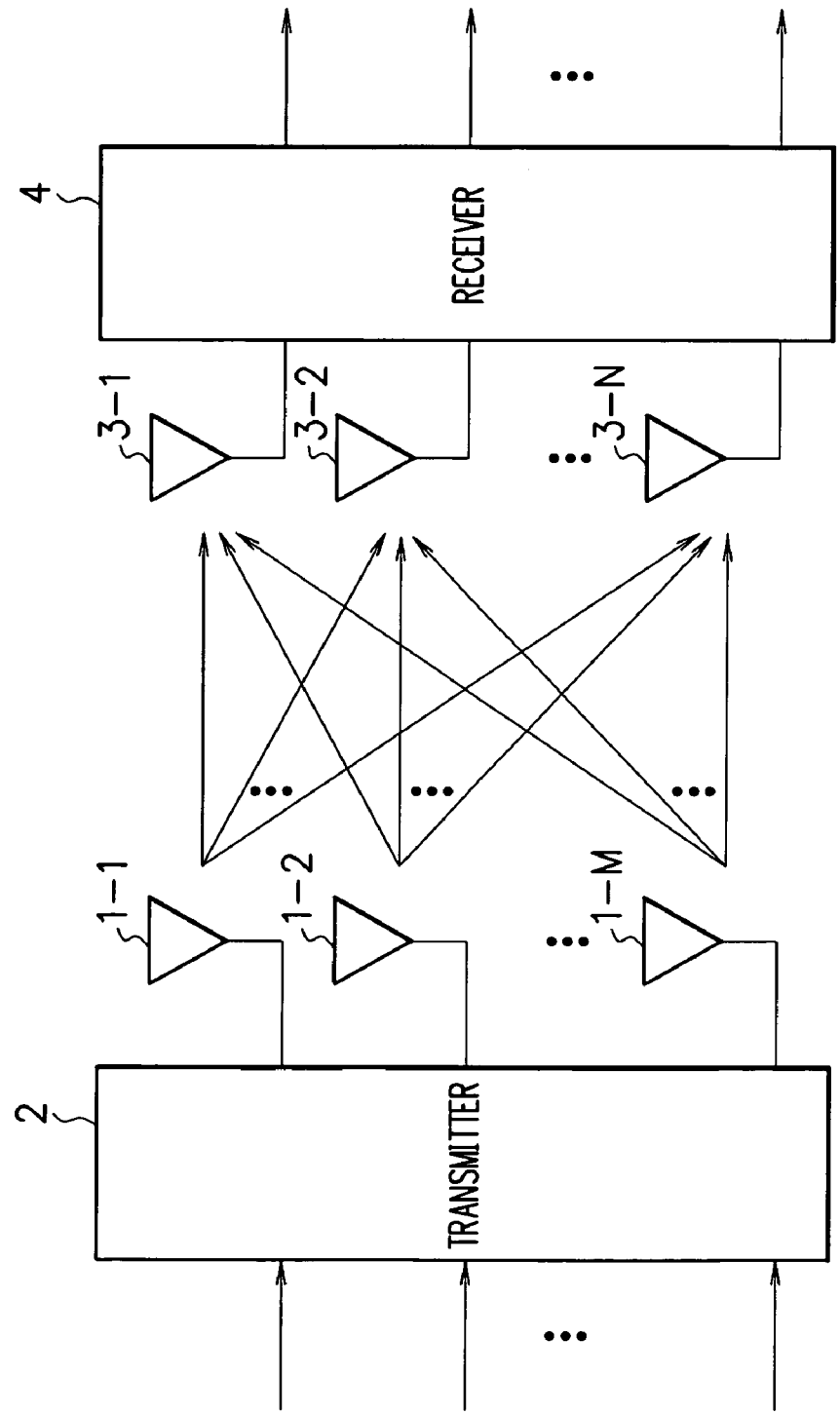
FIG. 1 is a diagram showing the construction of a MIMO transmitter/receiver.

Referring now to the drawings, a description of a preferred embodiment of the present invention will be given in detail.

Figure 2:
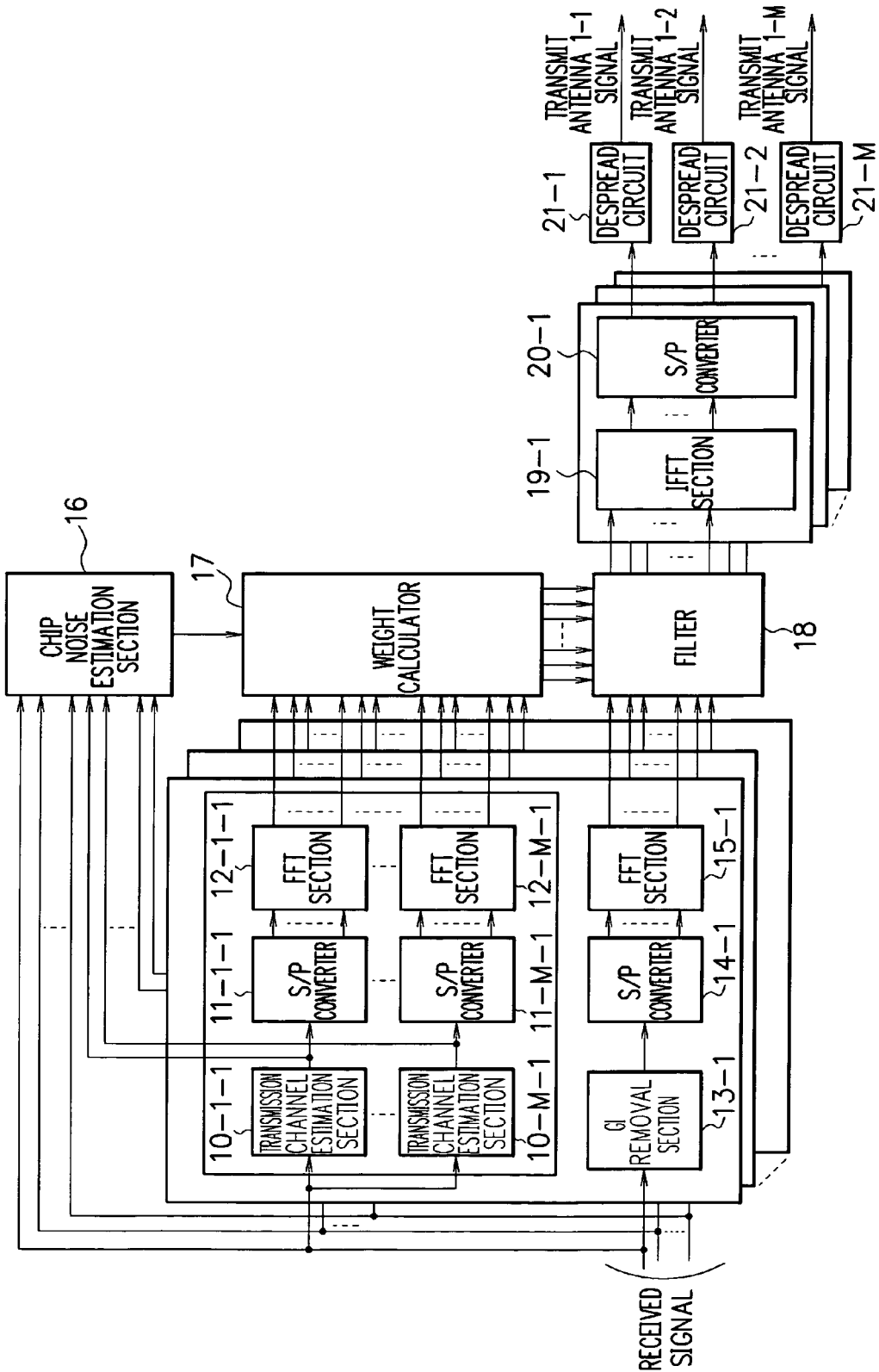
FIG. 2 is a diagram showing an example of the construction of a conventional MIMO receiver.
Figure 3:
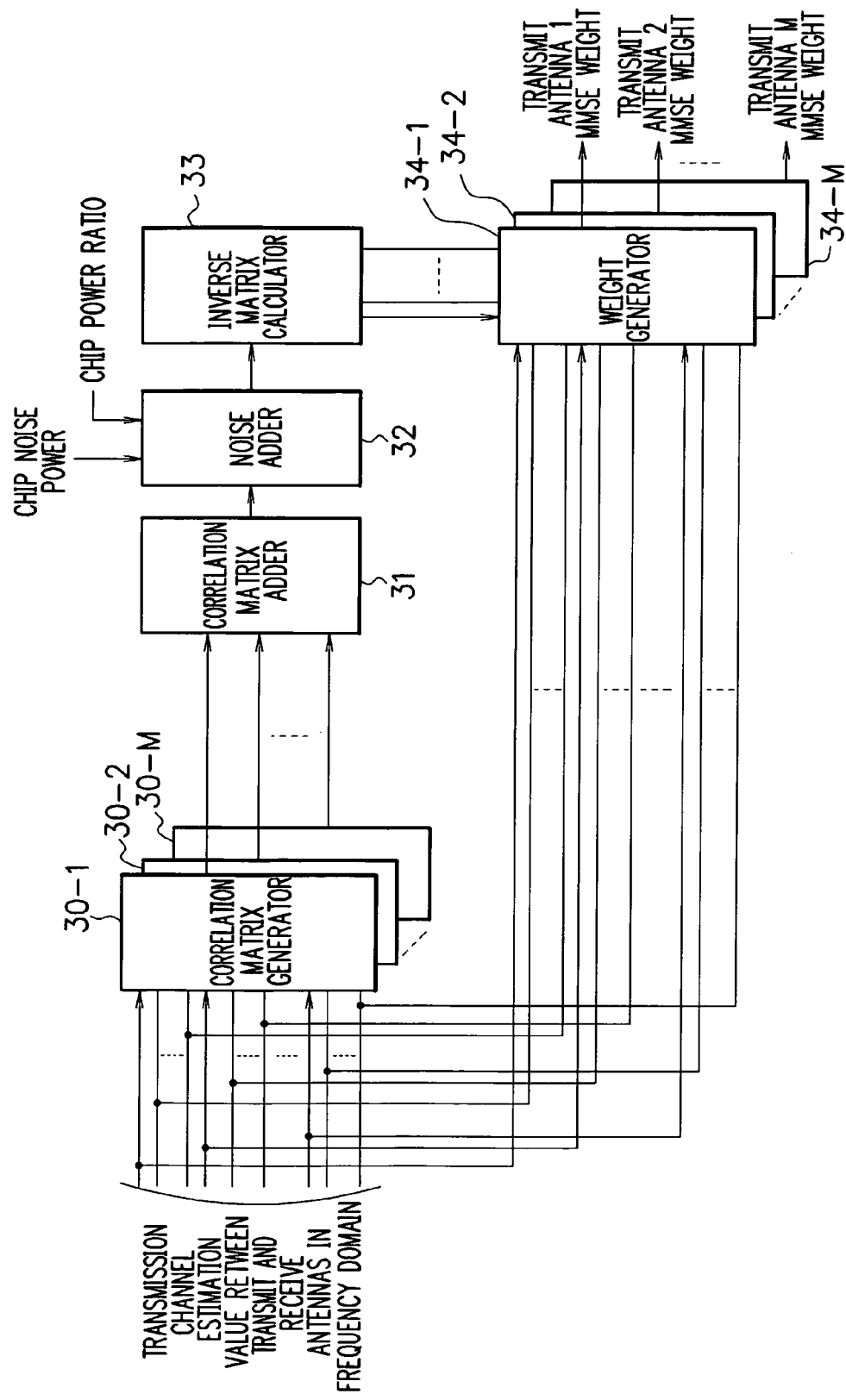
FIG. 3 is a block diagram showing the construction of a conventional weight calculator 17.
Figure 4:
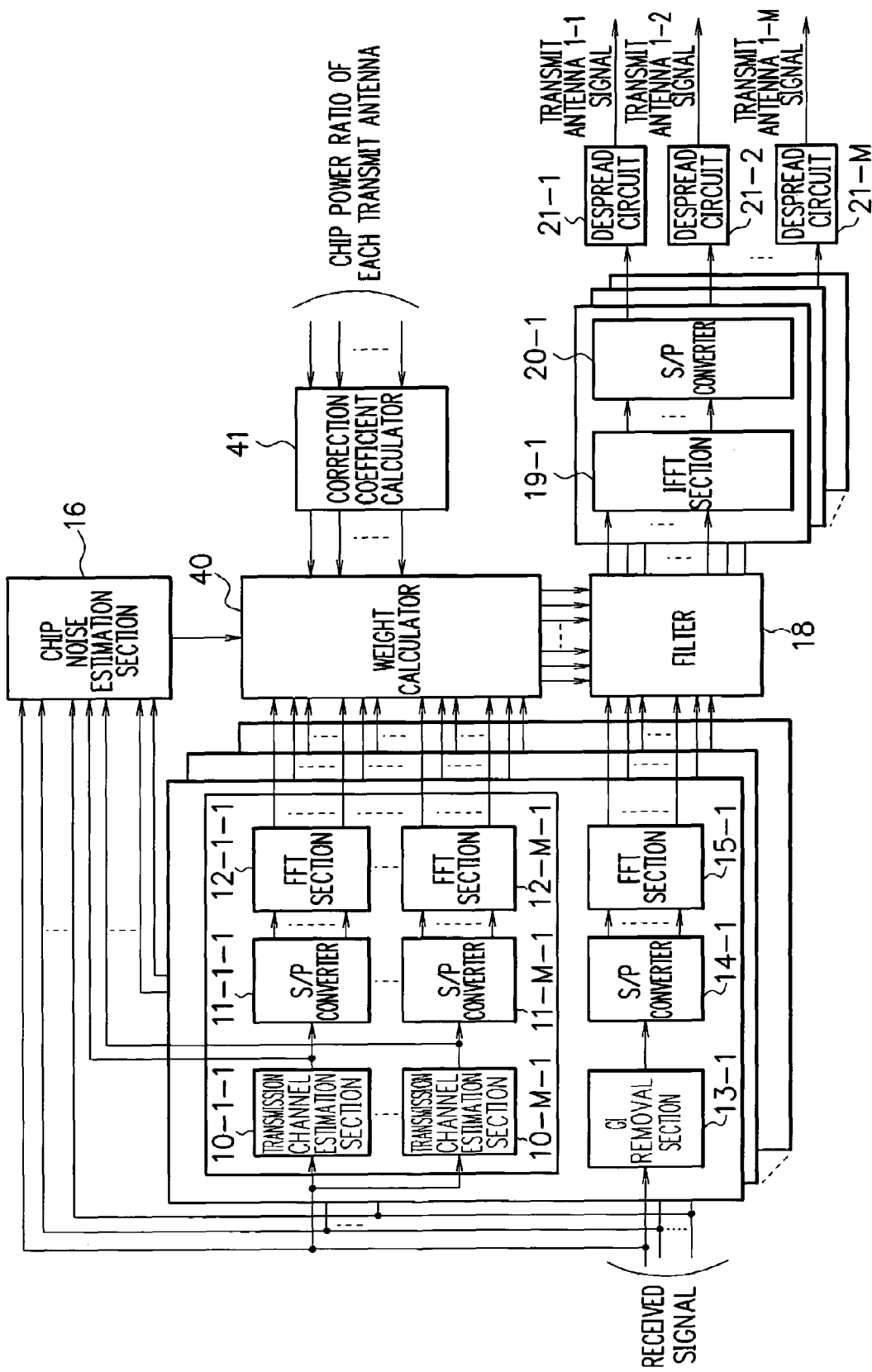
FIG. 4 is a diagram showing the construction of a MIMO receiver according to an embodiment of the present invention.

FIG. 4 is a diagram showing the construction of a MIMO receiver according to an embodiment of the present invention. Incidentally, in FIG. 4, like portions are designated by like reference numerals as in FIG. 2. Referring to FIG. 4, a description will be given of the MIMO receiver with M (M: an integer not less than 1) transmit antennas and N (N: an integer not less than 1) receive antennas.

As can be seen in FIG. 4, the MIMO receiver comprises transmission channel estimation sections 10-1-1 to 10-M-N, S/P (Serial to Parallel) converters 11-1-1 to 11-M-N and 14-1 to 14-N, FFT (Fast Fourier Transform) sections 12-1-1 to 12-M-N and 15-1 to 15-N, GI (Guard Interval) removal sections 13-1 to 13-N, a chip noise estimation section 16, a filter 18, IFFT (Inverse Fast Fourier Transform) sections 19-1 to 19-M, P/S (Parallel to Serial) converters 20-1 to 20-M, despread circuits 21-1 to 21-M, a weight calculator 40, and a correction coefficient calculator 41.

The transmission channel estimation sections 10-1-1 to 10-M-N input therein signals received by the receive antennas 3-1 to 3-N, respectively. With a known pilot signal contained in the received signal, the transmission channel estimation sections 10-1-1 to 10-M-N each estimate a transmission channel estimation value with respect to each path between the transmit antennas 1-1 to 1-M and the receive antennas 3-1 to 3-N to obtain an impulse response.

The S/P converters 11-1-1 to 11-M-N convert the impulse responses of the transmission channels estimated by the transmission channel estimation sections 10-1-1 to 10-M-N from serial to parallel.

The FFT sections 12-1-1 to 12-M-N receive as input the transmission channel impulse responses converted by the S/P converters 11-1-1 to 11-M-N, respectively, to transfer them into frequency domain.

The chip noise estimation section 16 inputs therein the signals received by the receive antennas 3-1 to 3-N as well as the transmission channel estimation values obtained by the transmission channel estimation sections 10-1-1 to 10-M-N to estimate chip noise power. There are various methods of estimating chip noise power. However, the methods are not directly involved in the present invention, and a full description thereof will not be made herein.

The correction coefficient calculator 41 receives as input the total chip signal power to pilot signal power ratio (chip power ratio) of each transmit antenna, and assumes or estimates pilot power in such a manner that the chip power ratio of each transmit antenna is equal to that of the reference transmit antenna. Thereby, the correction coefficient calculator 41 calculates a correction coefficient $\beta_m$ ($1 \leq m \leq M$) to correct the actual pilot power of each transmit antenna.

The weight calculator 40 receives as input the transmission channel impulse responses transferred into frequency domain by the FFT sections 12-1-1 to 12-M-N, the chip noise power estimated by the chip noise estimation section 16, and the correction coefficient $\beta_m$ obtained by the correction coefficient calculator 41. The weight calculator 40 calculates filter weights according to the minimum mean square error (MMSE) criterion.

The GI removal sections 13-1 to 13-N input therein signals received by the receive antennas 3-1 to 3-N, and eliminate part of the received signals corresponding to GI based on receive path timing.

The S/P converters 14-1 to 14-N convert the received signals, from which GI has been removed by the GI removal sections 13-1 to 13-N, from serial to parallel.

The FFT sections 15-1 to 15-N receive as input the received signals converted by the S/P converters 14-1 to 14-N, respectively, to transfer them into frequency domain.

The filter 18 inputs therein the weights obtained by the weight calculator 40 and the received signals transferred into frequency domain by the FFT sections 15-1 to 15-N. The filter 18 performs filtering (equalization) of the received signals in frequency domain. The filter 18 suppresses interference from other transmit antennas as well as the multipath interference of desired transmit antenna signals.

The IFFT sections 19-1 to 19-M receive as input the frequency-domain signals equalized by the filter 18 to transfer them back to time domain.

The P/S converters 20-1 to 20-M convert back the signals transferred into time domain from parallel to serial.

The despread circuits 21-1 to 21-M receive as input the time-domain signals converted by the P/S converters 20-1 to 20-M, and despread the signals to demodulate them to the original signals transmitted from the transmit antennas 1-1 to 1-M.

Figure 5:
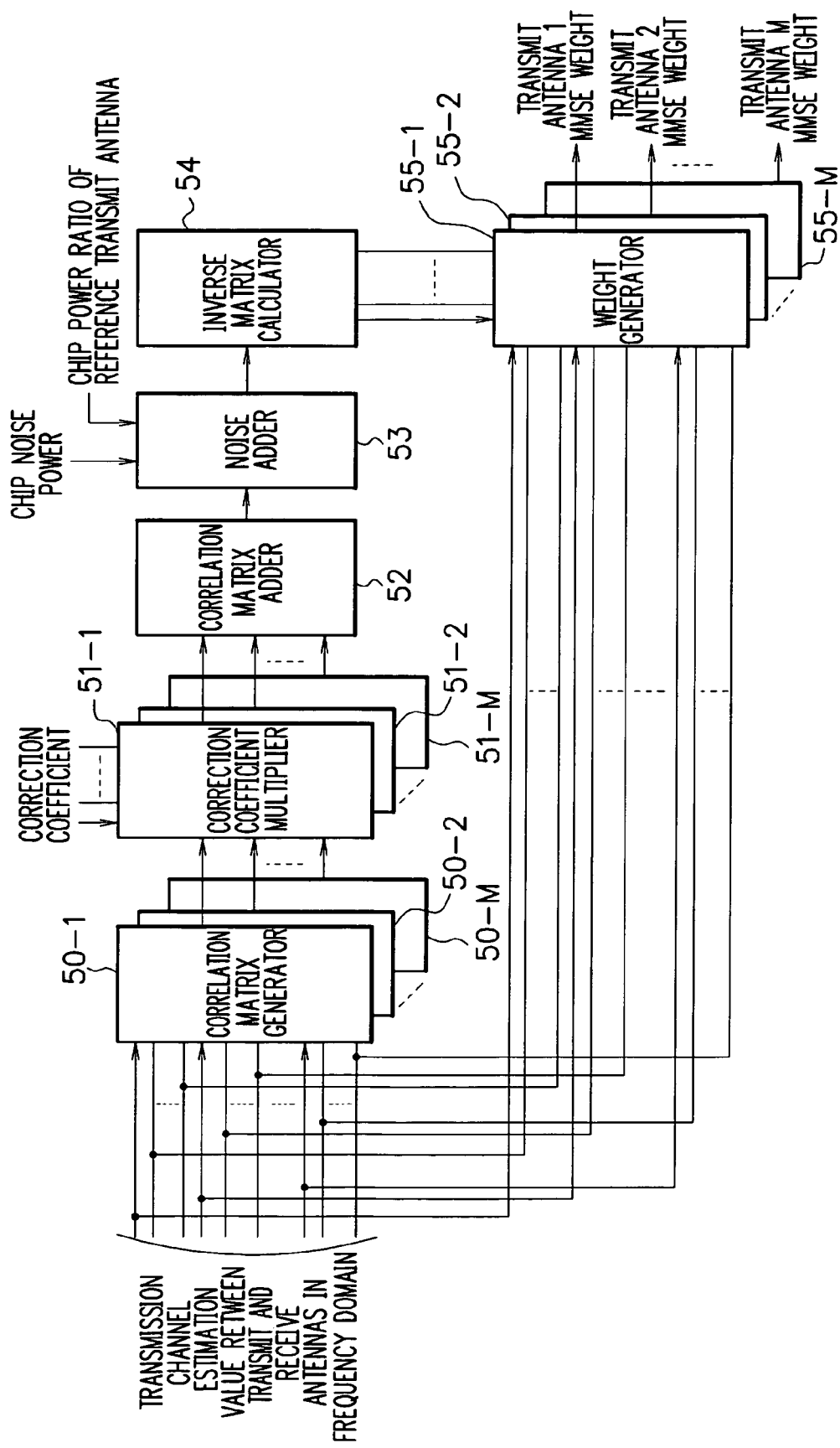
FIG. 5 is a block diagram showing the construction of a weight calculator depicted in FIG. 4.

In the following, a description will be given of the operation of the embodiment of the present invention referring to the drawings. Especially, the operation of the weight calculator 40 depicted in FIG. 4 will be described in detail. FIG. 5 is a block diagram showing the construction of the weight calculator 40 for a subcarrier f ($1 \leq f \leq F$) after the FFT. The weight calculator 40 for the subcarrier f comprises correlation matrix generators 50-1 to 50-M, correction coefficient multipliers 51-1 to 51-M, a correlation matrix adder 52, a noise adder 53, an inverse matrix calculator 54, and weight generators 55-1 to 55-M. The weight calculator 40 for each subcarrier has the same construction as described above.

The correlation matrix generators 50-1 to 50-M receive as input the transmission channel estimation values between the transmit and receive antennas transferred into frequency domain by the FFT sections 12-1-1 to 12-M-N shown in FIG.

4. Each of the correlation matrix generators 50-1 to 50-M generates a correlation matrix from transmit to receive antennas with respect to each transmit antenna.

The correction coefficient multipliers 51-1 to 51-M receive as input the correlation matrices for the respective transmit antennas generated by the correlation matrix generators 50-1 to 50-M and the correction coefficient $\beta_m$ obtained by the correction coefficient calculator 41. Each of the correction coefficient multipliers 51-1 to 51-M multiplies the correlation matrix with respect to each transmit antenna by the correction coefficient $\beta_m$ to correct the actual pilot power of each transmit antenna so that the chip power ratio of each transmit antenna is equal to that of the reference transmit antenna.

The correlation matrix adder 52 receives as input the correlation matrices for the respective transmit antennas 1-1 to 1-M each multiplied by the correction coefficient $\beta_m$ by the correction coefficient multipliers 51-1 to 51-M to add up them.

The noise adder 53 receives as input the summation correlation matrix obtained by the correlation matrix adder 52, the chip noise power estimated by the chip noise estimation section 16 shown in FIG. 4, and the chip power ratio of the reference transmit antenna. The noise adder 53 multiplies the chip noise power by the inverse of the chip power ratio of the reference transmit antenna, and adds the product to the correlation matrix.

The inverse matrix calculator 54 receives as input the correlation matrix to which a noise component has been added by the noise adder 53, and performs inverse matrix calculation.

The weight generators 55-1 to 55-M receive as input the inverse matrix obtained by the inverse matrix calculator 54 and transmission channel estimation values between the transmit and receive antennas transferred into frequency domain. Thereby, the weight generators 34-1 to 34-M generate filter weights.

Next, a description will be given in detail of the above processing through the use of mathematical expressions. The transmission vector $H_m(f)$ between the transmit antenna m ($1 \leq m \leq M$) and the receive antennas of the subcarrier f, in which the transmission channel impulse responses have been transferred into frequency domain by the FFT sections 12-1-1 to 12-M-N, is defined as in expression (1). Besides, the received signal vector $X(f)$ of the subcarrier f, in which the received signals have been transferred into frequency domain by the FFT sections 15-1 to 15-N, is defined as in expression (2). In this case, the weight vector $W_m(f)$ of the filter of the transmit antenna m for the subcarrier f calculated by the weight calculator 40 of FIG. 4 is given by the following expression:

$$W_m(f) = \left[ \sum_{m'=1}^{M} \beta_{m'} H_{m'}(f) H_{m'}^H(f) + \frac{P_1 N_0}{P_1 + D_1} I \right]^{-1} H_m(f) \tag{7}$$

where $P_1$ is the pilot power of the reference transmit antenna, and $D_1$ is the data power of the reference transmit antenna. The correction coefficient calculator 41 assumes pilot power $P'_{m'}$ in such a manner that the chip power ratio $\gamma_{m'} = (P_{m'} + D_{m'})/P_{m'}$ of the transmit antenna m' is equal to the chip power ratio $\gamma_1 = (P_1 + D_1)/P_1$ of the reference transmit antenna. Then, the correction coefficient calculator 41 calculates a correction coefficient $\gamma_{m'}$ ($1 \leq m' \leq M$) to correct the actual pilot power $P_{m'}$ of the transmit antenna m' to $P'_{m'}$. That is, the correction coefficient $\beta_{m'}$ is a value for correcting the following:

$H_{m'}(f) H_{m'}^H(f)$ and can be obtained by the following expression:

$$P'_{m'} = \frac{\gamma_{m'}}{\gamma_1} P_{m'} \tag{8}$$
$$= \beta_{m'} P_{m'}$$

FIG. 6 is a diagram showing the actual pilot power to which correction has been made by using expression (8). In FIG. 6, the area defined by a bold dashed line indicates the pilot power $P'_{m'}$ that renders the chip power ratio $\gamma_{m'}$ of the transmit antenna m' equal to the chip power ratio $\gamma_1$ of the reference transmit antenna.

As set forth hereinabove, in accordance with the present invention, the correction coefficient calculator 41 assumes or estimates such pilot power as to render the chip power ratio of each transmit antenna equal to that of the reference transmit antenna. Thereby, the correction coefficient calculator 41 corrects the actual pilot power of each transmit antenna. After that, the weight calculator 40 calculates filter weights. Thus, accurate MMSE control can be performed in MIMO filter reception even when each transmit antenna uses a different chip power ratio.

Incidentally, while, in the above embodiment, the first transmit antenna is used as the reference transmit antenna, any transmit antenna can serve as the reference transmit antenna with the same advantages.

Further, in the above embodiment, the weight calculator 40 and the filter 18 perform signal processing in frequency domain. However, the weight calculator 40 and the filter 18 may perform the signal processing in time domain with the same advantages.

The present invention is applicable to both the base station and mobile station wireless equipment in a mobile communication system.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A MIMO receiver for receiving signals transmitted from a plurality of transmit antennas through a plurality of receive antennas, the receiver comprising:
    a correction coefficient calculator for assuming such pilot power as to render the chip power ratio of each transmit antenna equal to that of the reference transmit antenna and calculating a correction coefficient to correct the actual pilot power of each transmit antenna;
    a weight calculator for calculating filter weights based on the minimum mean square error criterion using the correction coefficient and transmission channel estimation values between all the transmit and receive antennas; and
    a filter for filtering received signals with the weights and demodulating desired transmit antenna signals while suppressing interference transmit antenna signals.

2. The MIMO receiver claimed in claim 1, wherein correction coefficient calculator is fed with the chip power ratios $\gamma_1, \gamma_2, \ldots, \gamma_M$ (M: an integer not less than 1) of the respective transmit antennas, and calculates correction coefficients $\beta_1, \beta_2, \ldots, \beta_M$ to be $1, \gamma_2/\gamma_1, \ldots, \gamma_M/\gamma_1$, respectively, when using $\gamma_1$ as the chip power ratio of the reference transmit antenna.

3. The MIMO receiver claimed in claim 1, wherein the weight calculator and the filter perform signal processing in time domain.

4. The MIMO receiver claimed in claim 1, wherein the weight calculator and the filter perform signal processing in frequency domain.

5. The MIMO receiver claimed in claim 1, wherein the weight calculator, which performs signal processing in frequency domain, includes:

correlation matrix generators each generating a correlation matrix with respect to each transmit antenna based on transmission channel estimation values between the transmit and receive antennas expressed in frequency domain;

correction coefficient multipliers each multiplying the correlation matrix with respect to each transmit antenna generated by the correlation matrix generator by the correction coefficient obtained by the correction coefficient calculator;

a correlation matrix adder for adding up all the correlation matrices for the respective transmit antennas each multiplied by the correction coefficient;

a noise power adder for adding a noise component multiplied by the inverse of the chip power ratio of the reference transmit antenna to the summation correlation matrix obtained by the correlation matrix adder;

an inverse matrix calculator for calculating the inverse matrix of the correlation matrix to which the noise component has been added by the noise power adder; and weight generators each generating a weight based on the inverse matrix of the correlation matrix obtained by the inverse matrix calculator and the transmission channel estimation values between the transmit and receive antennas expressed in frequency domain.

6. A wireless communication system comprising:

a transmitter having a plurality of transmit antennas, which performs transmission through the transmit antenna using different chip power ratios; and the receiver claimed in claim 1.

7. A MIMO reception method applied to a receiver that receives signals transmitted from a plurality of transmit antennas through a plurality of receive antennas, the method comprising the steps of:

assuming such pilot power as to render the chip power ratio of each transmit antenna equal to that of the reference transmit antenna and calculating a correction coefficient to correct the actual pilot power of each transmit antenna;

calculating filter weights based on the minimum mean square error criterion using the correction coefficient and transmission channel estimation values between all the transmit and receive antennas; and filtering received signals with the weights and demodulating desired transmit antenna signals while suppressing interference transmit antenna signals.

* * * * *